United States Patent
Shrestha et al.

(10) Patent No.: US 12,108,293 B2
(45) Date of Patent: Oct. 1, 2024

(54) SWITCHING SATELLITES IN FIXED RADIO CELL

(71) Applicant: QUALCOMM Incorporated, San Diego, CA (US)

(72) Inventors: Bharat Shrestha, San Diego, CA (US); Umesh Phuyal, San Diego, CA (US); Xiao Feng Wang, San Diego, CA (US); Liangping Ma, San Diego, CA (US); Peter Gaal, San Diego, CA (US); Jun Ma, San Diego, CA (US); Ayan Sengupta, San Diego, CA (US); Alberto Rico Alvarino, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 540 days.

(21) Appl. No.: 17/444,559

(22) Filed: Aug. 5, 2021

(65) Prior Publication Data
US 2022/0046504 A1    Feb. 10, 2022

Related U.S. Application Data

(60) Provisional application No. 63/062,351, filed on Aug. 6, 2020.

(51) Int. Cl.
*H04W 36/00* (2009.01)
*H04B 7/185* (2006.01)
(Continued)

(52) U.S. Cl.
CPC ........ *H04W 36/08* (2013.01); *H04B 7/18513* (2013.01); *H04B 7/18519* (2013.01);
(Continued)

(58) Field of Classification Search
CPC ..... H04W 36/08; H04W 36/06; H04W 36/30; H04W 36/32; H04W 68/005;
(Continued)

(56) References Cited

U.S. PATENT DOCUMENTS

| | | | | |
|---|---|---|---|---|
| 5,732,351 A | * | 3/1998 | Olds | H04B 7/18541 370/321 |
| 5,936,570 A | * | 8/1999 | Ghazvinian | H04B 7/2125 342/359 |

(Continued)

FOREIGN PATENT DOCUMENTS

| | | |
|---|---|---|
| CN | 111182594 A | 5/2020 |
| KR | 20200086217 A | 7/2020 |

(Continued)

OTHER PUBLICATIONS

International Search Report and Written Opinion—PCT/US2021/071127—ISA/EPO—Nov. 29, 2021.

*Primary Examiner* — Amancio Gonzalez
(74) *Attorney, Agent, or Firm* — Norton Rose Fullbright US LLP

(57) ABSTRACT

In one aspect, a method of wireless communication includes operating, by a user equipment (UE), in a network with fixed radio cells. The method also includes determining, by the UE, a plurality of potential satellites for selecting a first cell to camp on, the first cell associated with a first satellite. The method includes performing cell reselection, by the UE, to select a cell associated with a second satellite using a selection condition. The method further includes establishing, by the UE, a connection with the second satellite for paging monitoring or wireless communications. Other aspects and features are also claimed and described.

27 Claims, 8 Drawing Sheets

(51) Int. Cl.
*H04W 36/06* (2009.01)
*H04W 36/08* (2009.01)
*H04W 36/30* (2009.01)
*H04W 36/32* (2009.01)
*H04W 68/00* (2009.01)
*H04W 72/044* (2023.01)

(52) U.S. Cl.
CPC ........... *H04W 36/06* (2013.01); *H04W 36/30* (2013.01); *H04W 36/32* (2013.01); *H04W 68/005* (2013.01); *H04W 72/044* (2013.01)

(58) Field of Classification Search
CPC ... H04W 72/044; H04W 76/27; H04W 84/06; H04W 60/04; H04W 48/20; H04W 36/00837; H04B 7/18513; H04B 7/18519
USPC .......................................................... 455/436
See application file for complete search history.

(56) References Cited

U.S. PATENT DOCUMENTS

| | | | | |
|---|---|---|---|---|
| 6,157,621 A * | 12/2000 | Brown | ................. | H01Q 25/008 370/310 |
| 6,195,037 B1 * | 2/2001 | Gross | ................. | H04B 7/2041 342/354 |
| 6,314,269 B1 * | 11/2001 | Hart | ................. | H04B 7/1855 455/12.1 |
| 6,512,920 B1 * | 1/2003 | Yaoya | ................. | H04B 7/18541 455/427 |
| 6,850,732 B2 * | 2/2005 | Patterson | ........... | H04B 7/18578 455/12.1 |
| 6,930,986 B2 * | 8/2005 | Dempo | ............. | H04W 36/0072 455/427 |
| 8,086,234 B2 * | 12/2011 | Paul | ................. | H04W 36/0007 455/442 |
| 9,369,931 B2 * | 6/2016 | Norman | ............ | H04W 36/0085 |
| 9,476,985 B2 * | 10/2016 | Scheitlin | ................. | G01S 19/07 |
| 10,355,778 B1 * | 7/2019 | Noerpel | ............. | H04B 7/18519 |
| 10,779,180 B2 * | 9/2020 | Kim | ...................... | H04W 24/10 |
| 11,032,751 B2 * | 6/2021 | Arur | ...................... | H04B 7/195 |
| 11,388,621 B2 * | 7/2022 | Tripathi | ............ | H04W 28/0268 |
| 11,528,644 B2 * | 12/2022 | Cheng | ................... | H04W 48/18 |
| 2004/0137842 A1 | 7/2004 | Iwata et al. | | |
| 2020/0178135 A1 | 6/2020 | Yun et al. | | |
| 2021/0136641 A1 * | 5/2021 | Roy | ................. | H04W 56/0015 |
| 2021/0227442 A1 * | 7/2021 | Yiu | ...................... | H04W 36/322 |
| 2021/0352714 A1 * | 11/2021 | Gao | ................. | H04W 74/0833 |
| 2022/0046424 A1 * | 2/2022 | Edge | ................... | H04W 12/122 |
| 2022/0052753 A1 * | 2/2022 | Speidel | ................ | H04W 16/10 |
| 2022/0070752 A1 * | 3/2022 | Kim | ................. | H04W 36/32 |
| 2022/0078746 A1 * | 3/2022 | Lee | ................. | H04B 7/18513 |
| 2022/0124581 A1 * | 4/2022 | Wang | ............. | H04W 36/00837 |
| 2022/0150818 A1 * | 5/2022 | Liberg | ............... | H04B 7/18539 |
| 2022/0225424 A1 * | 7/2022 | Wang | ................. | H04L 43/0864 |
| 2022/0250771 A1 * | 8/2022 | Series | ................... | G06T 1/0007 |
| 2022/0322176 A1 * | 10/2022 | Geng | ................. | H04W 36/0058 |
| 2022/0338230 A1 * | 10/2022 | Yu | ......................... | H04L 5/0053 |
| 2023/0055988 A1 * | 2/2023 | Liberg | ................. | H04W 76/19 |
| 2023/0102334 A1 * | 3/2023 | Roy | ..................... | H04W 36/06 370/316 |
| 2023/0116580 A1 * | 4/2023 | Cheng | ............... | H04W 56/0035 370/329 |
| 2023/0125129 A1 * | 4/2023 | You | ....................... | H04W 48/20 455/422.1 |
| 2023/0135073 A1 * | 5/2023 | Xu | .................. | H04W 36/00835 370/331 |
| 2023/0254900 A1 * | 8/2023 | Khan | ............... | H04W 74/0866 370/329 |
| 2023/0284275 A1 * | 9/2023 | Khan | ............... | H04W 74/0833 370/329 |
| 2023/0300699 A1 * | 9/2023 | Hong | ................... | H04W 48/16 370/331 |

FOREIGN PATENT DOCUMENTS

| | | |
|---|---|---|
| WO | WO-2017189862 A1 | 11/2017 |
| WO | WO-2020091647 A1 | 5/2020 |
| WO | WO-2020144572 A1 | 7/2020 |

* cited by examiner

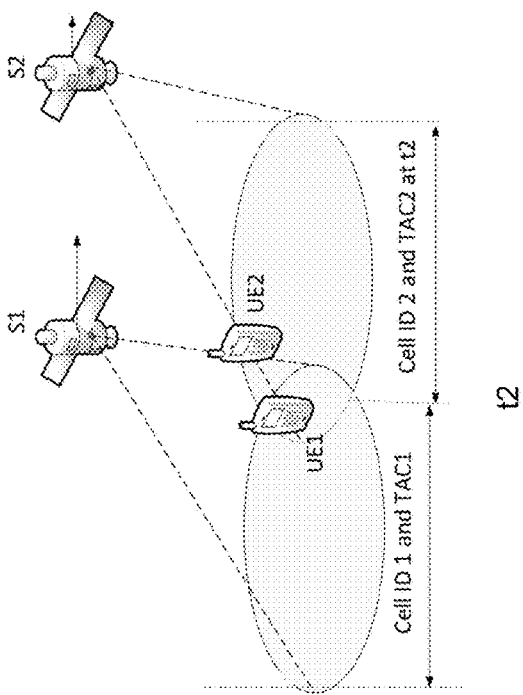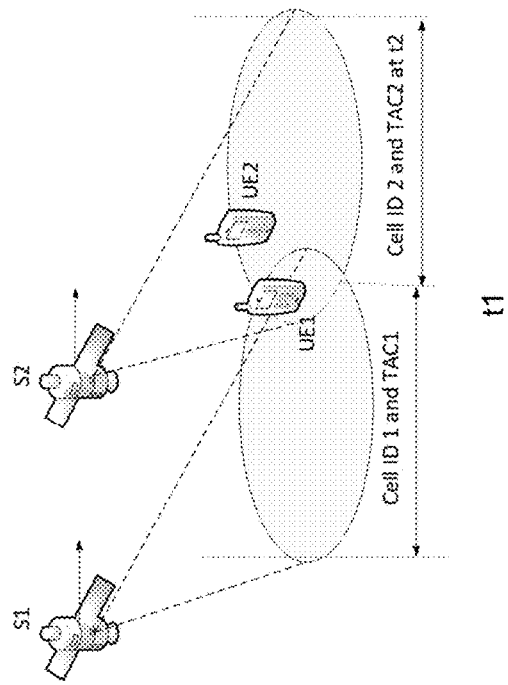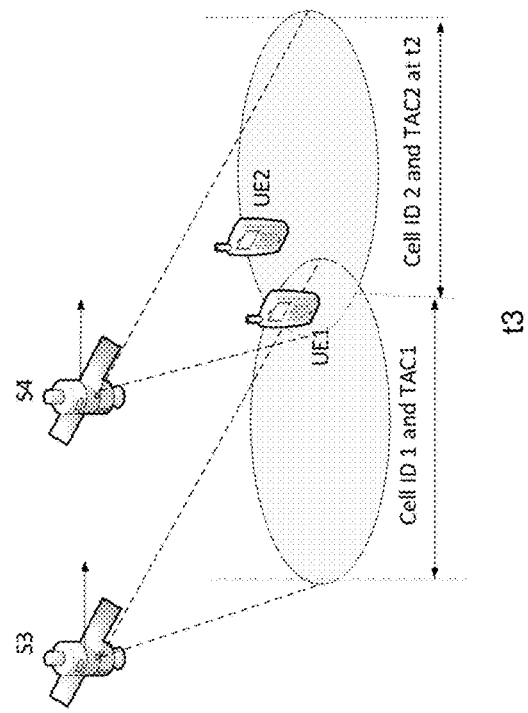
FIG. 3

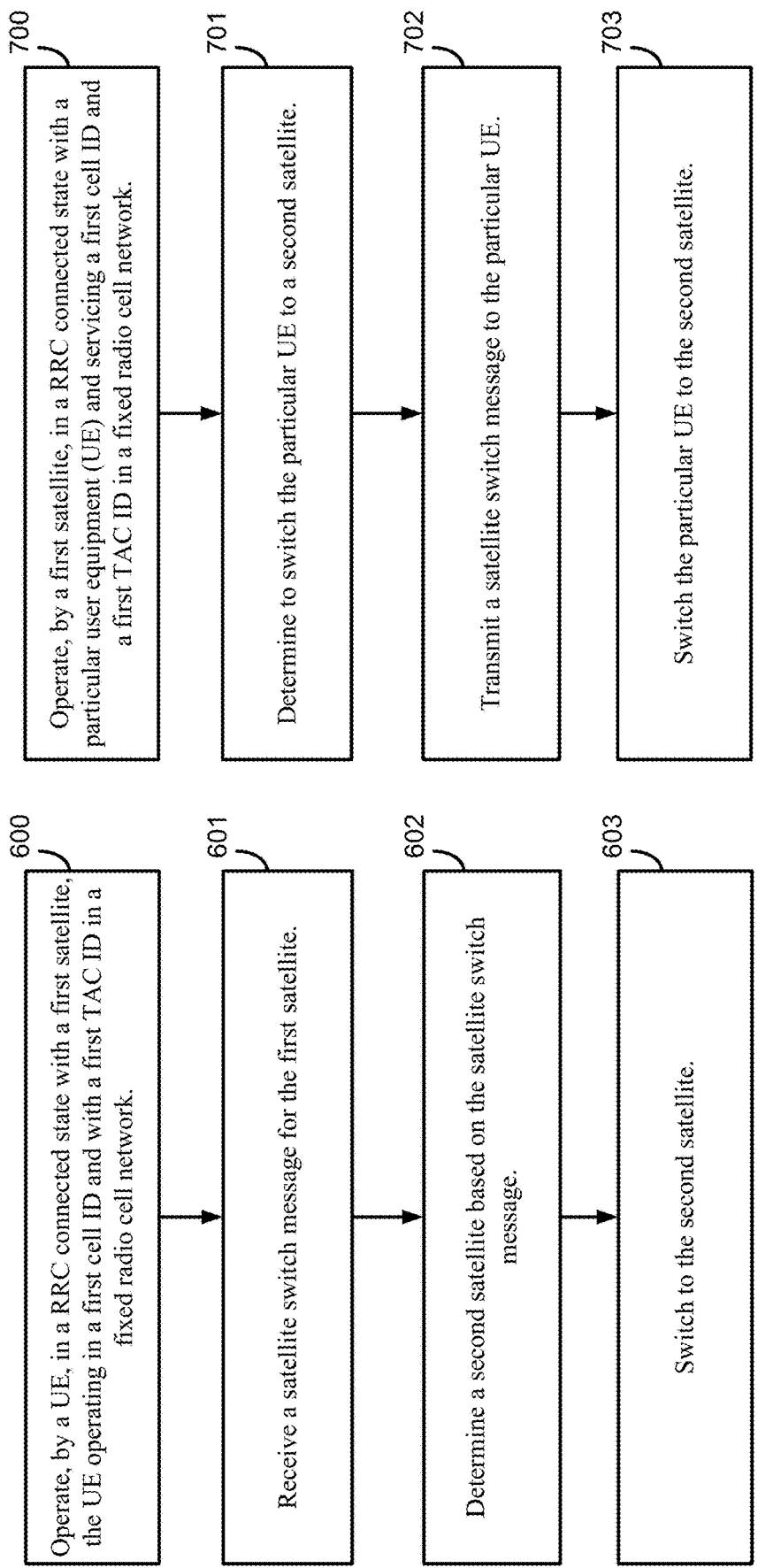

SWITCHING SATELLITES IN FIXED RADIO CELL

CROSS-REFERENCE TO RELATED APPLICATIONS

This application claims the benefit of U.S. Provisional Patent Application No. 63/062,351, entitled, "SWITCHING SATELLITES IN FIXED RADIO CELL," filed on Aug. 6, 2020, which is expressly incorporated by reference herein in its entirety.

TECHNICAL FIELD

Aspects of the present disclosure relate generally to wireless communication systems, and more particularly, to satellite and non-terrestrial networks. Certain embodiments of the technology discussed below can enable and provide enhanced satellite selection and switching.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication includes operating, by a user equipment (UE), in a network with fixed radio cells. The method also includes determining, by the UE, a plurality of potential satellites for selecting a first cell to camp on, the first cell associated with a first satellite. The method includes performing cell reselection, by the UE, to select a cell associated with a second satellite using a selection condition. The method further includes establishing, by the UE, a connection with the second satellite for paging monitoring or wireless communications.

In an additional aspect of the disclosure, an apparatus configured for wireless communication is disclosed. The apparatus includes at least one processor, and a memory coupled to the processor. The processor is configured to operate in a network with fixed radio cells; determine a plurality of potential satellites for selecting a first cell to camp on, the first cell associated with a first satellite; perform cell reselection to select a cell associated with a second satellite using a selection condition; and establishing a connection with the second satellite for paging monitoring or wireless communications.

In another aspect, a method of wireless communication includes operating, by a satellite network entity, with a particular user equipment (UE) and servicing a first cell ID and a first tracking area code (TAC) ID in a fixed radio cell network; transmitting, by the satellite network entity, a satellite switch message to the particular UE based on determining to switch the particular UE to a second satellite; and switching, by the satellite network entity, the particular UE to the second satellite.

In an additional aspect of the disclosure, an apparatus configured for wireless communication is disclosed. The apparatus includes at least one processor, and a memory coupled to the processor. The processor is configured to operate with a particular user equipment (UE) and servicing a first cell ID and a first tracking area code (TAC) ID in a fixed radio cell network; transmit a satellite switch message to the particular UE based on determining to switch the particular UE to a second satellite; and switch the particular UE to the second satellite.

In another aspect, a method of wireless communication includes operating, by a user equipment (UE), in a RRC idle state in a network with fixed radio cells; determining, by the UE, a plurality of potential satellites for selecting a first cell to camp on, the first cell associated with a first satellite; performing cell reselection, by the UE, to select a second satellite using a selection condition; and establishing, by the UE, a wireless connection with the second satellite for wireless communications.

In an additional aspect of the disclosure, an apparatus configured for wireless communication is disclosed. The apparatus includes means for operating, by a user equipment (UE), in a RRC idle state in a network with fixed radio cells; means for determining, by the UE, a plurality of potential satellites for selecting a first cell to camp on, the first cell associated with a first satellite; means for performing cell reselection, by the UE, to select a second satellite using a selection condition; and means for establishing, by the UE, a wireless connection with the second satellite for wireless communications.

In an additional aspect of the disclosure, a non-transitory computer-readable medium having program code recorded thereon. The program code further includes code to operate, by a user equipment (UE), in a RRC idle state in a network with fixed radio cells; determine, by the UE, a plurality of potential satellites for selecting a first cell to camp on, the first cell associated with a first satellite; perform cell reselection, by the UE, to select a second satellite using a selection condition; and establish, by the UE, a wireless connection with the second satellite for wireless communications.

In an additional aspect of the disclosure, an apparatus configured for wireless communication is disclosed. The apparatus includes at least one processor, and a memory coupled to the processor. The processor is configured to operate, by a user equipment (UE), in a RRC idle state in a network with fixed radio cells; determine, by the UE, a plurality of potential satellites for selecting a first cell to camp on, the first cell associated with a first satellite; perform cell reselection, by the UE, to select a second satellite using a selection condition; and establish, by the UE, a wireless connection with the second satellite for wireless communications.

In one aspect of the disclosure, a method of wireless communication includes operating, by a user equipment (UE), in a RRC idle state in a network with fixed radio cells; determining, by the UE, a plurality of potential satellites for selecting a first cell to camp on, the first cell associated with a first satellite; performing cell reselection, by the UE, to select a second satellite using a selection condition; and establishing, by the UE, a wireless connection with the second satellite for wireless communications.

In an additional aspect of the disclosure, an apparatus configured for wireless communication is disclosed. The apparatus includes means for operating, by a user equipment (UE), in a RRC idle state in a network with fixed radio cells; means for determining, by the UE, a plurality of potential satellites for selecting a first cell to camp on, the first cell associated with a first satellite; means for performing cell reselection, by the UE, to select a second satellite using a selection condition; and means for establishing, by the UE, a wireless connection with the second satellite for wireless communications.

In an additional aspect of the disclosure, a non-transitory computer-readable medium having program code recorded thereon. The program code further includes code to operate, by a user equipment (UE), in a RRC idle state in a network with fixed radio cells; determine, by the UE, a plurality of potential satellites for selecting a first cell to camp on, the first cell associated with a first satellite; perform cell reselection, by the UE, to select a second satellite using a selection condition; and establish, by the UE, a wireless connection with the second satellite for wireless communications.

In an additional aspect of the disclosure, an apparatus configured for wireless communication is disclosed. The apparatus includes at least one processor, and a memory coupled to the processor. The processor is configured to operate, by a user equipment (UE), in a RRC idle state in a network with fixed radio cells; determine, by the UE, a plurality of potential satellites for selecting a first cell to camp on, the first cell associated with a first satellite; perform cell reselection, by the UE, to select a second satellite using a selection condition; and establish, by the UE, a wireless connection with the second satellite for wireless communications.

In another aspect of the disclosure, a method of wireless communication includes operating, by a user equipment (UE), in a RRC connected state with a first satellite, the UE operating in a first cell ID and with a first TAC ID in a fixed radio cell network; receiving, by the UE, a satellite switch message for the first satellite; determining, by the UE, a second satellite based on the satellite switch message; and switching, by the UE, to the second satellite.

In another aspect of the disclosure, a method of wireless communication includes operating, by a satellite network entity, in a RRC connected state with a particular user equipment (UE) and servicing a first cell ID and a first TAC ID in a fixed radio cell network; determining, by the satellite network entity, to switch the particular UE to a second satellite; transmitting, by the satellite network entity, a satellite switch message to the particular UE based on determining to switch the particular UE to the second satellite; and switching, by the network entity, the particular UE to the second satellite.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3 is a diagram of an illustrative example of satellite coverage for fixed radio cells.

FIG. 6 is a flow diagram illustrating another example of blocks executed by a UE configured according to an aspect of the present disclosure.

FIG. 7 is a flow diagram illustrating example blocks executed by a base station configured according to an aspect of the present disclosure.

DETAILED DESCRIPTION

Figure 1:
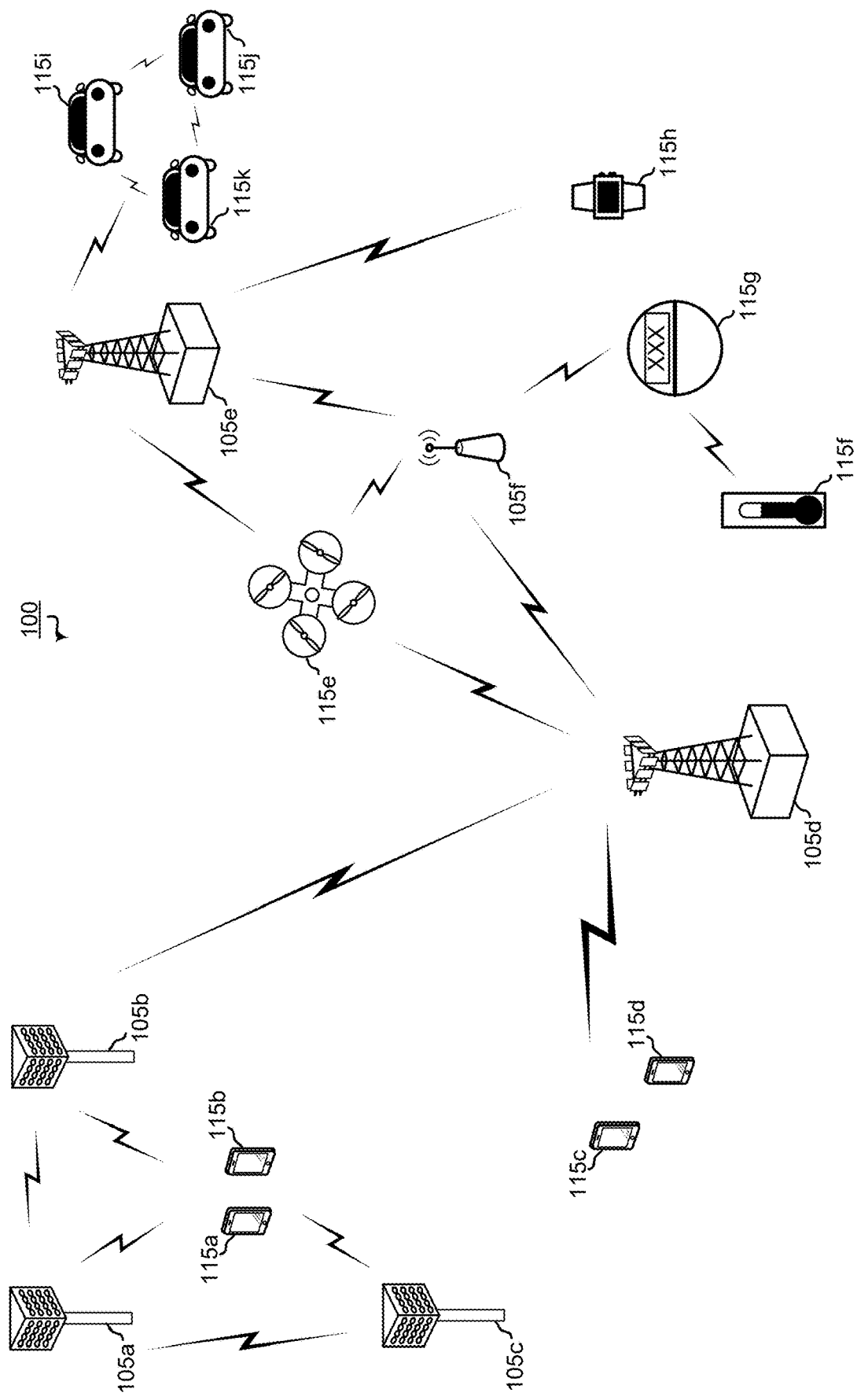
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects descried with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD/FDD communications, such as in a vehicle-to-vehicle (V2V) mesh network between UEs 115i-115k communicating with macro base station 105e.

Figure 2:
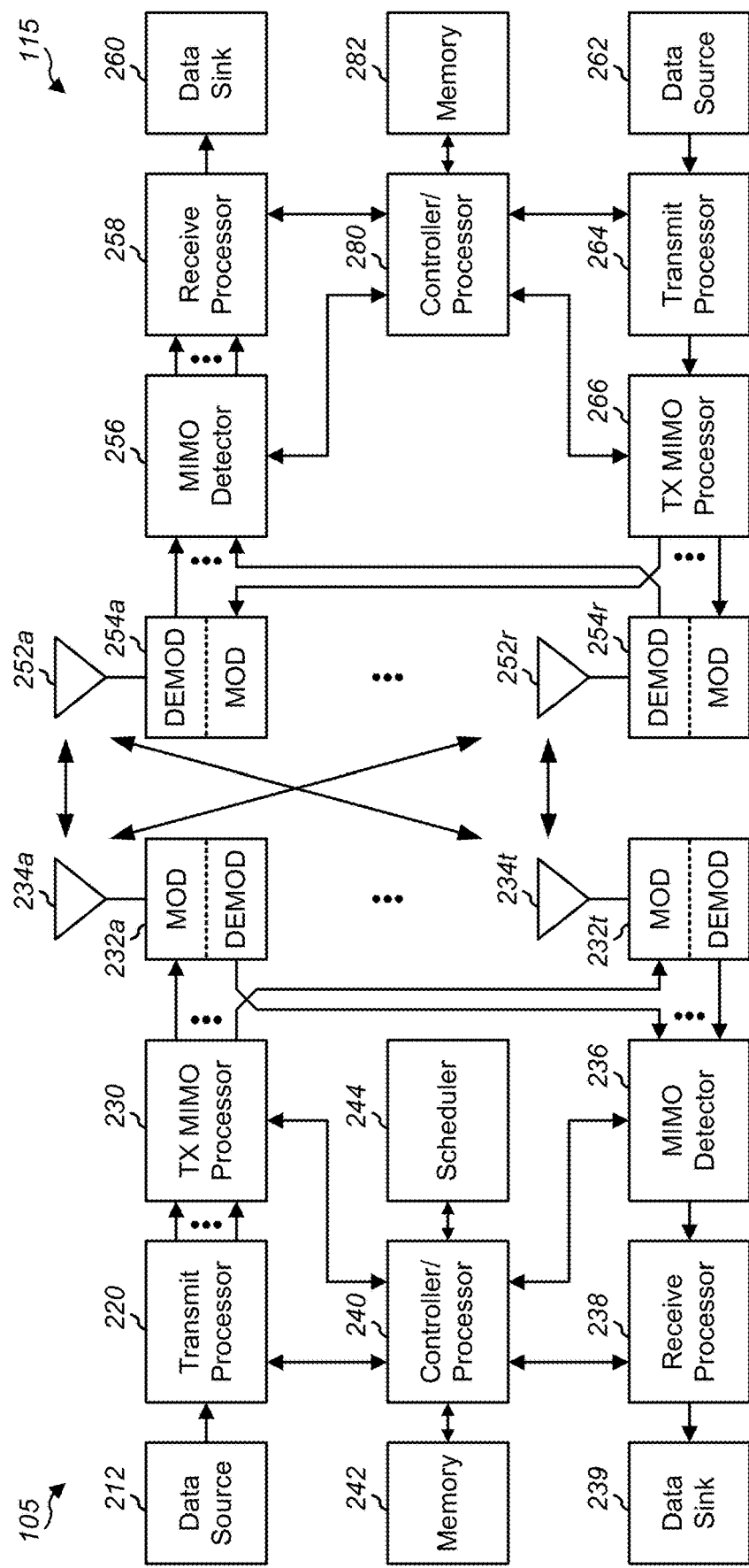
FIG. 2 is a block diagram conceptually illustrating a design of a base station and a UE configured according to some embodiments of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105f in FIG. 1, and UE 115 may be UE 115c or 115D operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 5-7, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

FIG. 3 illustrates examples of satellite coverage areas for a fixed radio cell network. In fixed radio cell networks, such as terrestrial networks, a UE receives a particular cell ID for a particular location. Even though a network entity serving the UE may change, the UE still receives the same cell ID. For example, a first UE (UE1) may always select a first cell identifier (cell ID 1) and first tracking area code (TAC1) for a given location. However, when satellites (e.g., non-geosynchronous satellites) are used to serve fixed radio cells, the movement of the satellites cause the satellites to move in and out of different cells. Thus, the satellites serve different cells at different times. This satellite switching causes device handovers, such as additional handovers as compared to terrestrial network entities.

An example of satellites serving radio cells is illustrated in FIG. 3. Referring to FIG. 3, FIG. 3 depicts satellites servicing two cells at three different times. In FIG. 3, the diagram illustrates four satellites.

At a first time (t1), a first satellite (S1) is providing service to a first cell (cell ID 1) and a first tracking area code (TAC1), and a second satellite (S2) is providing service to a second cell (cell ID 2) and a second tracking area code (TAC2). The first and second satellites are moving left to right in the example of FIG. 3, and at the first time are at a leading edge of servicing the first cell.

Similarly, at a second time (t2), the first satellite (S1) is providing service to the first cell (cell ID 1) and the first tracking area code (TAC1), and the second satellite (S2) is providing service to the second cell (cell ID 2) and the second tracking area code (TAC2). The first and second satellites are at a trailing edge of servicing the first cell and second cells at the second time.

From the first time to the second time, the first satellite belongs to and provides service to cell ID 1 and TAC1. and the second satellite (S2) belongs to and provides service to cell ID 2 and TAC2.

At a third time (t3), the first and second satellites may no longer provide service to the first and second cells; a third satellite (S3) and a fourth satellite (S4) may provide service to the first and second cells, respectively.

However, during such operations a single beam edge will be varying due to the "stretching" of the beam, and a UE near or at a cell edge may ping pong between cells, and thus satellites. For example, at the first time t1, the first UE (UE1) may select the second cell (cell 2 and the second satellite), and at the second time t2, the first UE may select the first cell (cell 1 and the first satellite). Additionally, at the third time t3, the first UE (UE1) may select the second cell (cell 2) again.

From time t1 to t2 and/or t2 to t3, the RTD in a cell may change abruptly. For example, there is a round trip delay difference between the first and second satellites at the second time for UE1. Thus, when the first UE switches from the second cell to the first cell (and therefore the second satellite to the first satellite), the RTD experienced by the UE changes sharply. This may cause the UE to miss transmissions and/or delay the transmissions.

However, if rather the first UE selected the first cell at the first time and possibly until the third time, the first UE may reduce handovers, that is eliminate the handover at the second time from the second cell to the first cell. Reducing handovers may prevent ping ponging between cells and network entities and also may reduce the adjustments made by the UE. Accordingly, power, latency and failures may be reduced.

In some implementations, the first satellite may provide service to the second cell. For example, at some time between the second time and the third time, the second satellite may cease servicing the second cell and the first satellite may begin servicing the second cell.

Figure 4:
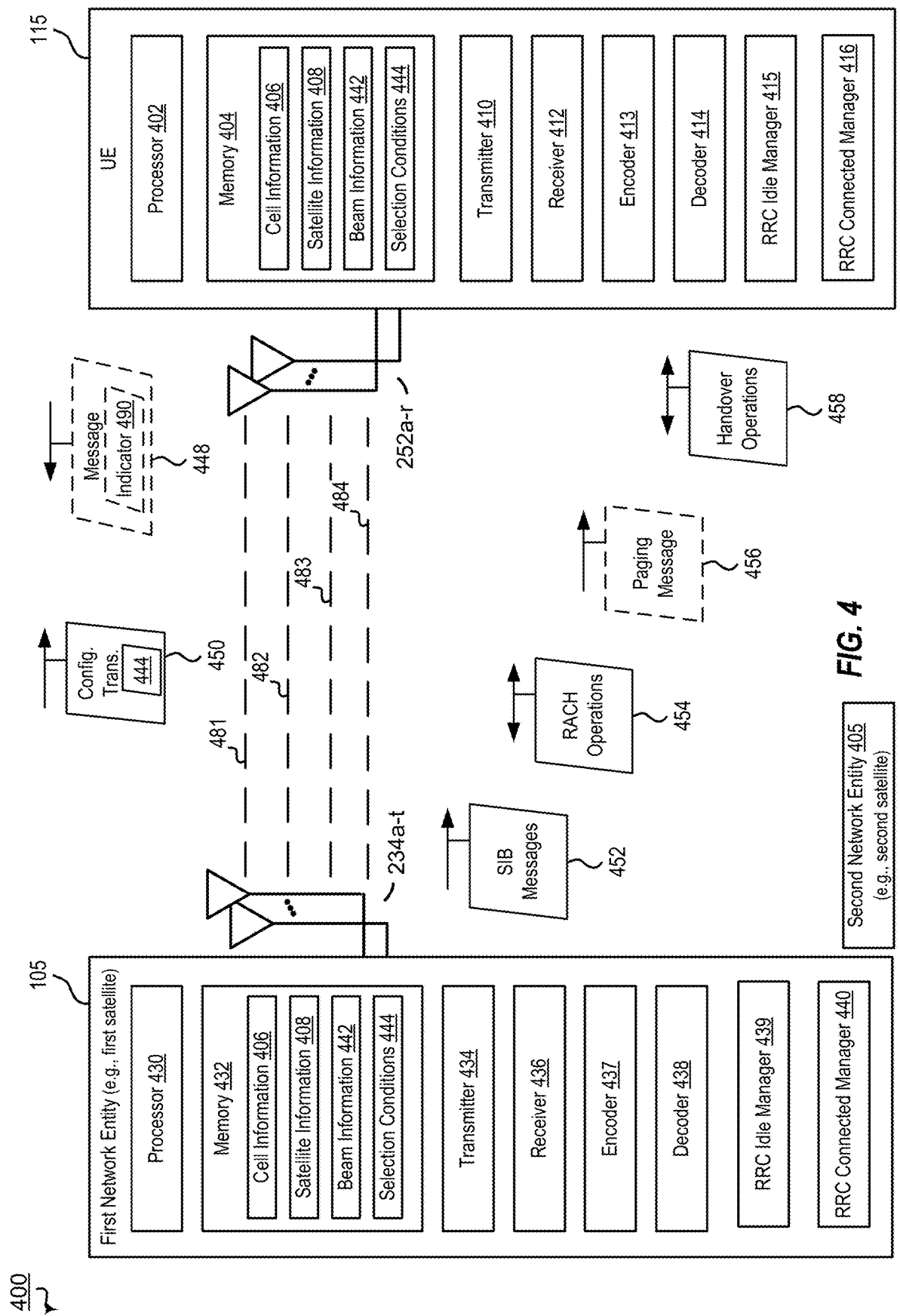
FIG. 4 is a block diagram illustrating an example of a wireless communications system (with a UE and base station) with satellite selection operations.

FIG. 4 illustrates an example of a wireless communications system 400 that supports satellite selection operations in accordance with aspects of the present disclosure. In some examples, wireless communications system 400 may implement aspects of wireless communication system 100. For example, wireless communications system 400 may include UE 115, and first network entity 105, and a second network entity 405. The network entities 105 and 405 may include or correspond to satellite network entities. The enhanced satellite selection operations described herein may reduce power consumption and network switching by enabling a UE to stay attached to satellites for an increased amount of time and may reduce satellite switching operations. Thus, network and device performance can be increased.

Network entities 105, 405 and UE 115 UE 115 may be configured to communicate via frequency bands, such as FR1 having a frequency of 410 to 7125 MHz, FR2 having a frequency of 24250 to 52600 MHz for mm-Wave, and/or one or more other frequency bands. It is noted that SCS may be equal to 15, 30, 60, or 120 kHz for some data channels. Network entities 105, 405 and UE 115 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, Hybrid automatic repeat request (HARQ) process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via network entities 105, 405 and UE 115. For example, the control information may be communicated using Medium Access Control (MAC) Control Element (MAC CE) transmissions, Radio Resource Control (RRC) transmissions, Downlink control information (DCI) transmissions, another transmission, or a combination thereof.

UE 115 can include a variety of components (e.g., structural, hardware components) used for carrying out one or more functions described herein. For example, these components can includes processor 402, memory 404, transmitter 410, receiver 412, encoder, 413, decoder 414, RRC Idle manager 415, RRC Connected manager 416, and antennas 252*a-r*. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store cell information data 406, satellite information data 408, beam information data 442, settings data, or a combination thereof, as further described herein.

The cell information data 406 includes or corresponds to data that is associated with fixed radio cells. The cell information data 406 may include cell identifier data (e.g., cell ID), cell boundary data, a tracking area code identifier data (e.g., TAC ID), cell frequency data, or a combination thereof.

The satellite information data 408 includes or corresponds to data indicating or corresponding to satellites which provide service/coverage to the cells. For example, the satellite information data 408 may include possible satellites to which the UE 115 may connect to. To illustrate, the satellite information data 408 may indicate a plurality of satellites which may provide coverage to a cell where the UE 115 is located or may soon travel. The satellite information 408 may include a satellite identifier (e.g., satellite ID), cell service information (e.g., associated cell ID), round trip delay (RTD) information, timing advance (TA) information, an angle of elevation, an angle of arrival, an expiry time, satellite movement information, satellite position information, quality information, or a combination thereof.

The beam information data 442 includes or corresponds to data that is associated with beams and beam parameters. The beam information data 442 may include beam identifier data (e.g., beam ID), direction data, frequency data, beam quality data (e.g., Reference Signal Received Power (RSRP), Reference Signal Received Quality (RSRQ), Signal-to-interference-plus-noise ratio (SINR), etc.), or a combination thereof. The beam information 442 may include beam parameters for multiple satellites and/or cells and information to quickly switch between the cells and/or satellites.

The selection condition data 444 includes or corresponds to data associated with or corresponding to cell and/or satellite selection (e.g., reselection) condition information. For example, the selection condition data 444 may indicate one or more possible selection conditions or preferences. The selection condition data 444 may also include thresholds or data used to evaluate the selection conditions, such as conditions or formulas for determining a threshold value.

The UE 115 may optionally include settings data. The settings data includes or corresponds to data associated with satellite selection operations. The settings data may include one or more types of satellite connection and/or release operation modes and/or thresholds or conditions for switching between cells, satellites, or both. For example, the settings data may have data indicating different thresholds for different satellite selection modes.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. RRC Idle manager 415 may be configured to determine and perform RRC Idle management operations, such as satellite selection (e.g., reselection) operations. For example, RRC Idle manager 415 is configured to determine and camp on a first cell and satellite. As another example, RRC Idle manager 415 is configured to determine whether to switch to another cell and satellite.

RRC Connected manager 416 may be configured to determine and perform RRC Connected management operations. For example, RRC Connected manager 416 may be configured to determine a satellite to connect to based on network indication. Such a satellite may include or correspond to a satellite which is taking over coverage for a particular cell or area because the previous satellite is moving out of range and will be servicing a new area or cell.

Network entities 105, 405 include processor 430, memory 432, transmitter 434, receiver 436, encoder 437, decoder 438, RRC Idle manager 439, RRC Connected manager 440, and antennas 234*a-t*. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store cell information data 406, satellite information data 408, beam information data 442, settings data, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, network entities 105, 405 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of network entities 105, 405 described with reference to FIG. 2.

Encoder 437, and decoder 438 may include the same functionality as described with reference to encoder 413 and decoder 414, respectively. RRC Idle manager 439 may include similar functionality as described with reference to RRC Idle manager 415. RRC Connected manager 440 may include similar functionality as described with reference to RRC Connected manager 416.

During operation of wireless communications system 400, first network entity 105 may determine that UE 115 has satellite selection capability. For example, UE 115 may transmit a message 448 that includes a satellite selection indicator 490 (e.g., a cell selection indicator). Indicator 490 may indicate satellite selection operation capability or a particular type or mode of satellite selection operation. In some implementations, first network entity 105 sends control information to indicate to UE 115 that satellite selection operation and/or a particular type of satellite selection operation is to be used. For example, in some implementations, message 448 (or another message, such as configuration transmission 450) is transmitted by the first network entity 105. The configuration transmission 450 may include or indicate to use satellite selection operations or to adjust or implement a setting of a particular type of satellite selection operation.

During operation, devices of wireless communications system 400, perform satellite selection operations. For example, the first network entity 105 and the UE 115 exchange transmissions to set a particular satellite and/or cell configuration. Such transmissions may include or correspond to system information block (SIB) transmissions. In the example of FIG. 4, the first network entity 105 transmits (e.g., broadcasts) one or more SIB messages 452. The one or more SIB messages 452 may be received by the UE 115. The SIB messages 452 may include or correspond to SIB1 or SIB2 messages. The SIB message 452 may include information which enables the UE 115 to select the first network entity 105 and camp on the first network entity 105. The UE 115 may be in or may enter into an RRC idle state.

While in the RRC idle state, the UE 115 monitors for short messages or paging messages. For example, first network entity 105 may broadcast or transmit short messages or paging messages to the UE 115. The short messages or paging messages may enable the UE 115 to maintain its RRC idle state and/or stay camped on a cell associated with the first network entity 105.

The UE 115 may optionally enter into an RRC connected state if the UE 115 has data send to the network or another device. For example, the UE 115 may perform RACH operations with the first network entity 105 and transition to the RRC connected stated. The RACH operations may include 2-step RACH operations, 4-step RACH operations, or another type of RACH operations. In such implementations, the UE 115 may transition back to an RRC idle state if the UE 115 stops having data to send and/or receive.

After the UE 115 has camped on the network entity, the UE 115 may perform cell reselection operations. The UE 115 may select another cell and/or satellite to connect to using one or more selection conditions, such as cell/satellite reselection conditions, of selection conditions data 444.

For example, when operating in a RRC unconnected state or mode, such as an RRC idle state, UE 115 may select a particular incoming satellite from a plurality of satellites when in an overlapping coverage area. When selecting a satellite to connect to, one or more of the following conditions can be considered, an expiry time condition, a satellite movement condition, an elevation angle difference condition (e.g., time and distance difference), an angle of arrival difference condition, a frequency information condition, a quality delta condition, a network trigger signal condition, or a combination thereof. In such implementations, a satellite may take over a new cell one or more cell diameters away from the old cell it was previously servicing.

An expiry time condition may include a condition or preference to select a satellite with a latest or furthers into the future expiry (or expiration) time, that is a time when the satellite will no longer serve a particular cell. This expiry time condition corresponds to a longest or longer duration to serve a particular cell in which the UE is located in. This amount of time may be referred to as an service duration or expiry duration. If the UE attached to a cell and satellite with a latest expiry time, the UE will possibly reduce the amount of handovers and extend the amount of time connected to the satellite. Accordingly, operation and efficiency are improved.

As an example, each cell broadcasts a satellite ID and a corresponding expiry time for the cell. The UE then compares the expiry times and selects the latest time or longest duration. For example, if the UE is near a cell boundary and/or is in a coverage area where it is serviceable by two or more cells and/or satellites, the UE receives multiple messages including satellite information and expiry time information. The UE then compares the expiry times to select the satellite with the latest or longest time. Alternatively, the UE may receive information which indicates the expiry time (such as satellite position, movement speed, movement direction, etc.), and the UE calculates the expiry time of each satellite. Similarly, the UE then compares the expiry times to select the satellite with the latest or longest time.

The UE may perform such an expiry determine per satellite or per cell. For example, the UE may compare expiry times for multiple satellites for a single cell. As another example the UE may compare one (or more) satellites for multiple cells. If two best cells belong to different satellites, the UE selects the cell based on expiry time, i.e., the cell/satellite that has longer expiry time is selected. The expiry time condition may be used with one or more of the following conditions. Also, the expiry time may be a preference which is used in a weighted calculation or a threshold condition. For example, only consider satellites within X seconds of the latest expiry time based on one or more of the following conditions.

A satellite movement condition may include a condition or preference to select a satellite based on a beam steering pattern, which itself is determine based on satellite movement information, such as satellite position, movement speed, movement direction, etc. For example, the UE receives a message with the satellite information or tracks the satellite movement from past transmissions. The UE then determines and angle of elevation for the satellite and cell. The UE may then steer its antenna back and forth between two satellites to connect to the cell or cells.

An quality delta condition (change in quality condition) may include a condition or preference to select a cell or stay with (maintain a connection to) a current serving cell as long as a metric of the serving cell is not worse than another cell by a threshold (i.e., delta). The quality metric may include or correspond to a RSRP, a RSRQ, SINR, or a combination thereof. Alternatively, the quality metric may include or correspond to a RTD, a TA, an elevation angle, or a combination thereof. For example, if a current or prior serving cell has a metric with a value of 10 and another cell (other highest performing cell) has a value of 14, the UE will stay attached to or attempt to connect to the serving cell when the delta value is 5. The delta value or threshold can be set by the network and indicated to the UE by RRC message.

A prior knowledge condition may include a condition or preference to select a cell based on a UE's position and frequency. The UE may have previously received frequency information for a cell or a particular portion of the cell. For example the UE may receive frequency information (e.g., a frequency map or range of frequencies supported) in a system message, such as a SIB (e.g., SIB1 or SIB2). Alternatively, the system message may indicate which cell IDs and frequencies that may be selected regardless of UE's position within the cell coverage.

In such implementation, the UE may determine if it has moved or not. For example, the UE may track its position and/or speed and direction to determine if a change in position has occurred. If the UE has changed positions, such as at changed positions by more than a threshold, the UE can select a cell which is different satellite from a cell of its current serving satellite.

A last cell priority condition may include a condition or preference to select a cell (and satellite) based on a cell ID of a satellite which the UE was last connected to (e.g., in RRC connected state with). This preference to select a cell may also involve a threshold or delta condition. For example, the UE will select the cell as along as it is not worse than a threshold worse than another cell (another highest performing cell). The quality metrics may include similar quality metrics as described above with respect to the quality delta conditions.

A network indicated condition may include a condition or preference to select a cell, a satellite, or both based on network signaling. For example, the UE receives a paging indication (e.g., paging or short message) from a current or previous satellite which indicates that a UE should monitor or connect to a new satellite at a particular (e.g., new or different elevation angle). The UE may then use this new elevation angle (e.g., elevation angle information) to connect to or track the satellite. The paging indication may be transmitted via DCI. This DCI may be sent without a corresponding PDSCH transmission (i.e., the DCI may not signal a PDSCH transmission).

In some implementations, the UE 115 determines a first expiry time for a first satellite of the plurality of potential satellites, determines a second expiry time for a second satellite of the plurality of potential satellites, and compares the first expiry time and the second expiry time to determine a longest expiry time, where the selected satellite has the longest expiry time.

In some implementations, the UE 115 determines a first satellite position and a first satellite speed for a first satellite, determines an angle of elevation, a RTD, or both, for the first satellite based on the first satellite position and the first satellite speed, determines a first beam steering pattern for the first satellite based on the angle of elevation, the RTD, or both. The UE 115 also determines a second satellite position and a second satellite speed for a second satellite, determines an angle of elevation, a RTD, or both, for the second satellite based on the second satellite position and the second satellite speed, and determines a second beam steering pattern for the second satellite based on the angle of elevation, the RTD, or both. The first and second beam steering patterns may then be used to switch between the first and second satellites to monitor for paging messages prior to cell reselection.

In some implementations, the UE 115 determines a first satellite position and a first satellite speed for a first satellite, determines an angle of arrival, a RTD, or both, for the first satellite based on the first satellite position and the first satellite speed, and determines a first beam steering pattern for the first satellite based on the angle of arrival, the RTD, or both. The UE 115 also determines a second satellite position and a second satellite speed for a second satellite, determines an angle of arrival, a RTD, or both, for the second satellite based on the second satellite position and the second satellite speed, and determines a beam steering pattern for the second satellite based on the angle of arrival, the RTD, or both. The beam steering patterns of the satellites may then be used to switch between the first and second satellites to monitor for paging messages prior to cell reselection.

In some implementations, the UE 115 determines a first quality metric for the first satellite, wherein the first satellite corresponds to a current serving cell of the UE, determines a second quality metric for the second satellite, and compares a difference between the first quality metric and the second quality metric to a quality threshold. The quality metric includes RSRP, RSRQ, SINR, or a combination thereof. Additionally, a value of the quality threshold (e.g., delta) may be based on an elevation angle difference or an angle of arrival difference for the satellite during a period of time of cell coverage. Based on the outcome of the comparison, the UE 115 selects a satellite. For example, if the first quality metric is not less than second quality metric by the threshold value, the UE 115 stays with the first satellite. If the first quality metric is less than the second quality metric by greater than the threshold value, the UE 115 switches to the second satellite.

In some implementations, the UE 115 receives a SIB message from the first satellite including a plurality of frequencies for a cell, determines a current position of the UE, and determines a frequency from the plurality of frequencies acquired from the first satellite. The UE 115 also determines a change in position or a speed of the UE and determines whether the UE has changed position (left the cell or sub-cell of the cell). Responsive to determining that a change in position of the UE is less than a threshold, the UE 115 selects/maintains the first satellite, or responsive to determining that a change in position of the UE is greater than the threshold, the UE 115 selects the second satellite.

In some implementations, the UE 115 determines a first quality metric for the cell of the first satellite, where the first satellite corresponds to the last satellite which the UE was in a RRC connected state with, determines a second quality metric for the cell of the second satellite, and compares a difference between the first quality metric and the second quality metric to a prioritization threshold. The UE 115 also determines to select the second satellite as the selected satellite based on the difference being greater than or equal to the prioritization threshold. Alternatively, the UE 115 may select/maintain the first satellite based on the difference being less than or equal to the prioritization threshold.

In some implementations, the UE 115 receives a network trigger message to connect to the second satellite. The UE 115 then connects to the second satellite. Alternatively, the UE 115 monitors the second satellite to receive paging messages, but does not connect to the second satellite.

During or prior to some such selection and switching operations, the UE 115 may exchange transmissions with multiple network entities (e.g., 105, 405) to obtain information used during the cell reselection process. For example, the UE 115 may determine cell information 406, satellite information 408, and/or beam information 442 from the transmissions. To illustrate, the UE 115 may receive short or paging messages 456 from multiple network entities 105 and 405 which may indicate cell information (e.g., cell IDs) and satellite information (e.g., satellite IDs). The UE 115 may determine beam information from the short or paging messages 456, such as which beam to use for each satellite, a timing for each satellite, etc.

The UE 115 may have to adjust its beam parameters and timing settings when monitoring for such short or paging messages 456. For example, the UE 115 may use one particular beam (e.g., direction, frequency, and/or shape) and/or timing when monitoring the first network entity 105 and another particular beam and/or timing when monitoring the second network entity 405. The UE 115 may monitor each network entity during paging occasions or windows. In some implementations, the paging occasion or windows may overlap or occur such that the UE 115 will not be able to adjust its beam settings and timings quick enough to listen to sequential paging occasion for two network entities. In such implementations, the UE 115 and network entity or entities may adjust operations to accommodate the UE 115 adjustments used for monitoring for paging messages 456 from both network entities.

For example, when a new satellite takes over a cell or when the UE 115 performs cell reselection, the UE 115 may be adjusting the beam, uplink/downlink timing due to a change in RTD or performing beam re-selection.

If a paging occasion falls during this time (e.g., time slot), the paging message 456 may be delayed by network to avoid the UE 115 missing the paging occasion. The paging message 456 may be delayed in one or more ways. The paging message 456 may be delayed and transmitted in next paging occasion by the particular satellite and cell, the paging message 456 may be retransmitted by the particular satellite and cell, and/or the paging may be transmitted by both satellites covering the same cell. In such implementations, such as where both satellites transmit, the UE 115 will finish monitoring the paging occasion for the first satellite before switching to the new satellite if the UE 115 cannot finish switching be the paging occasion.

In some implementations, the UE 115 receives a paging indication from the first satellite indicating to monitor a new satellite at different elevation angle, the new satellite corresponding to the second satellite.

In some implementations, the UE 115 adjusts a beam (e.g., modification or selection), an uplink timing, a downlink timing, RTD, or a combination thereof.

In some implementations, the UE 115 determines that beam selection or adjustment with the second satellite will cease prior to a first paging occasion with the first satellite, and monitors for a paging message in the first paging occasion with the second satellite.

In some other implementations the UE 115 determines that beam selection or adjustment with the second satellite will occur during a first paging occasion with the first satellite, and monitors for a paging message in the first paging occasion with the first satellite before selecting a cell of the second satellite.

In some other implementations, the UE 115 monitors for a first paging message in a first paging occasion, and monitors for a second paging message in a second paging occasion different from the first paging occasion. The UE 115 may receiving the first paging message from the first satellite and the second paging message from the second satellite.

After determining a cell and satellite to connect to, the UE 115 performs RACH operations 454 with the satellite, i.e., second network entity 405, and transitions to the RRC connected stated with the second network entity 405. The RACH operations 454 may include 2 step RACH operations, 4 step RACH operations, or another type of RACH operations.

While the UE is an RRC connected state with the second network entity 405, a new network entity (e.g., third network entity, such as a third satellite) may take over the cell, which may change the RTD and TA for the UE 115. The UE 115 may switch or be "handed over" from the second network entity 405 to the new network entity. This switch may occur due to the movement of the satellites and the satellites ceasing to serve one cell and beginning to serve another cell. The UE 115 and the second and third network entities may perform switching operations, such as handover operations 458. The handover operations 458 may include conventional handover operations, such as the transmission of a RRC reconfiguration message or messages.

In such switching or handover implementations, the BWP configuration may change or may not change. For example, an active BWP used for the second network entity 405 may be different from or the same as an active BWP used for the new network entity.

In such implementations where the BWP configuration does not change, the UE 115 may receive a message from the second network entity 405 to switch to a new satellite. The message may be a UE specific signal or a group specific signal. The message indicates that it is time for UE 115 to use new satellite. This message (e.g., satellite switch indication) can be DCI based or MAC CE based. The message may indicate or include a new RTD and/or TA value to use for the new/next satellite.

For example, an indication with new TA command MAC CE may be sent to the UE 115. This MAC CE may be piggybacked by DL data through the outgoing satellite, i.e., second network entity 405. As another example, when the message is a group specific signal, a DCI can be sent using a common search space (CSS) to indicate a switch and/or information for the switch.

In other implementations, the UE 115 receives a beam switch command to indicate a switch to new satellite (e.g., that a new satellite will be taking over coverage for the cell). In either case (i.e., the switch message or beam switch command), transmission may be received by the UE 115 as early as in Msg2 or Msg4 during RRC connection setup procedure or RA procedure.

In some implementations, a HARQ process or processes may be continued when operating with the new satellite. Additionally, or alternatively, one or more timers and uplink and/or downlink scheduling may be adjusted by an offset. The offset may be used to account for possible interruptions during the satellite switching or from changes made to a beam direction or pointing angle for the UE 115.

In some other implementations, the BWP configuration changes when a new satellite takes over the cell. For example, when a new satellite takes over the, the active BWP may be changed by a BWP switch command. The BWP switch command may be sent through the outgoing satellite, such as the second network entity 405 in the example FIG. 4. The BWP switch command (e.g., BWP switching message) may further indicate or include a particular beam, RTD value, and/or TA value.

After connecting to the second network entity 405, the UE 115 may transition back to an RRC idle state if the UE 115 stops having data to send and/or receive or the UE 115 may select another cell and satellite to connect to. For example, the UE 115 may perform (e.g., reperform) cell reselection operations similar to as described when the UE 115 switched from the first network entity 105 (and cell thereof) to the second network entity 405 (and cell thereof).

Accordingly, the UE 115 and network entities 105, 405 may be able to more efficiently and effectively perform satellite selection operations. Thus, FIG. 4 describes enhanced satellite and cell selection operations. Using enhanced satellite and cell selection operations may enable improvements when operating in fixed radio cell networks. Performing enhanced satellite and cell selection operations enables reduced power consumption and network overhead when cell selection operations and switching operations and thus, enhanced UE and network performance by increasing throughput and reducing latency.

Figure 5:
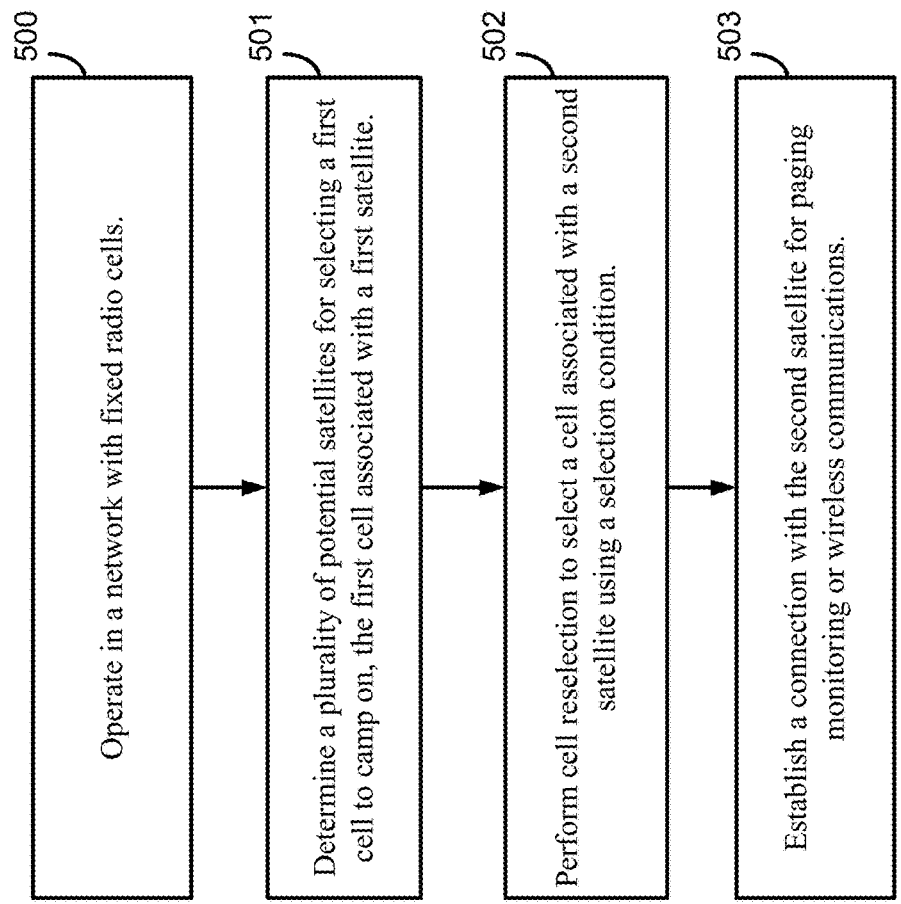
FIG. 5 is a flow diagram illustrating example blocks executed by a UE configured according to an aspect of the present disclosure.
Figure 8:
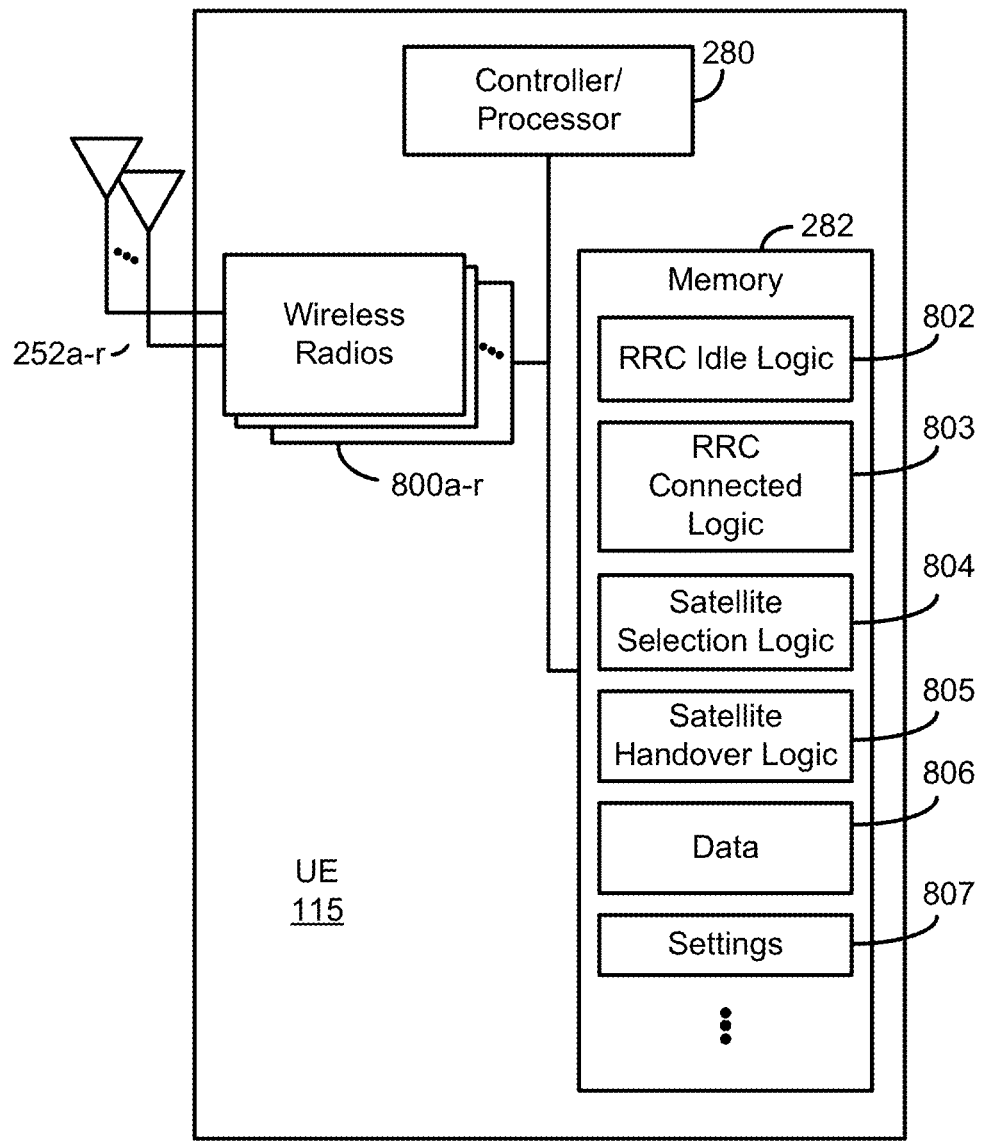
FIG. 8 is a block diagram conceptually illustrating a design of a UE configured to perform precoding information update operations according to some embodiments of the present disclosure.

FIG. 5 is a flow diagram illustrating example blocks executed by a UE configured according to an aspect of the present disclosure. The example blocks will also be described with respect to UE 115 as illustrated in FIG. 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800*a-r* and antennas 252*a-r*. Wireless radios 800*a-r* includes various components and hardware, as illustrated in FIG. 2 for UE 115, including modulator/demodulators 254*a-r*, MIMO detector 256, receive processor 258, transmit processor 264, and TX MIMO processor 266. As illustrated in the example of FIG. 8, memory 282 stores RRC idle logic 802, RRC connected logic 803, satellite selection logic 804, satellite handover logic data 805, data 806, and settings data 807.

At block 500, a wireless communication device, such as a UE, operates in a network with fixed radio cells. For example, the UE 115 is operating in a RRC idle state in a network with fixed radio cells, as described with reference to FIGS. 3 and 4. The radio cells have a fixed area and/or location. In some implementations, the radio cells are fixed (e.g., permanently fixed). In other implementations, the radio cells are temporarily fixed. That is, the cells are fixed for a period of time and then can be shifted around and fixed for another period of time. As another example, the UE 115 is operating in a RRC connected state in a network with fixed radio cells, as described with reference to FIGS. 3 and 4.

At block 501, the UE 115 determines a plurality of potential satellites for selecting a first cell to camp on, the first cell associated with a first satellite. For example, the UE 115 determines a plurality of potential satellites to connect to and selects a first cell to camp on, as described with reference to FIGS. 3 and 4. The first satellite is associated with a first cell. The UE 115 may monitor for paging message with camped on the first satellite and in a RRC idle state with the first satellite. In some implementations, the UE 115 may also enter into a RRC connected state with the first satellite. For example, the UE 115 may have data to send (and/or receive) and may enter into a RRC connected state. The UE 115 may receive a paging message, (e.g., DCI) which indicates or signals for the UE to send the transmission. The UE 115 may revert back or change to the RRC idle state when the transmission is over.

At block 502, the UE 115 performs cell reselection to select a cell associated with a second satellite using a selection condition. For example, the UE 115 uses one or more selection criteria to select a cell associated with a second satellite to connect to, as described with reference to FIGS. 3 and 4. To illustrate, the UE 115 may employ one or more of an expiry time condition of a satellite coverage, a satellite movement condition, an elevation angle difference condition (e.g., time and distance difference), an angle of arrival condition, a frequency information condition, a quality delta condition, or a network trigger signal condition. The second satellite may have a different cell ID than the first satellite or the same cell ID as the first satellite. In a particular implementation, the UE 115 uses an expiry time to determine which cell (and corresponding satellite) to select. The expiry time may be received from the network, such as from the first or second satellite, or the expiry time may be determined (e.g., calculated) by the UE 115.

At block 503, the UE 115 establishes a connection with the second satellite for paging monitoring or wireless communications. Establishing the connection with the second satellite may include camping on the second satellite (which is different from the first satellite) for paging monitoring operations when the UE is in a RRC idle state. The UE may than use information determined from the paging messages to connect to the second satellite and enter a RRC connected state. For example, the UE 115 performs RACH operations to connect to the second satellite, as described with reference to FIGS. 3 and 4. Establishing the connection with the second satellite may also include resuming a connection with the second satellite for uplink transmission, downlink transmissions, or both, when the UE is in a RRC connected state. The UE 115 may resume the connection and transmit or receive data independent of transmitting or receiving paging messages.

The UE 115 may execute additional blocks (or the UE 115 may be configured further perform additional operations) in other implementations. For example, the UE 115 may perform one or more operations described above or as described with reference to FIG. 6. As another example, the UE 115 may operate in accordance with one or more aspects described below.

In a first aspect, the selection condition indicates timing information for a cell stop time, the cell stop time indicating when a serving radio cell will stop serving a particular area, and the UE 115 further switches to the cell associated with the second satellite before the cell stop time.

In a second aspect, alone or in combination with the first aspect, establishing the connection includes: camping on the second satellite for paging monitoring operations when in a RRC idle state; or resuming a connection for uplink transmission, downlink transmissions, or both, when in a RRC connected state.

In a third aspect, alone or in combination with one or more of the above aspects, prior to performing cell reselection the UE 115 further: monitors for a first paging message from the first satellite; receives the first paging message; adjusts, beam settings, round trip delay (RTD) settings, timing advance (TA) settings, or a combination thereof; monitors for a second paging message from the second satellite; and receives the second paging message.

In a fourth aspect, alone or in combination with one or more of the above aspects, the second satellite is associated with a second cell, and wherein the first and second cells are the same cell.

In a fifth aspect, alone or in combination with one or more of the above aspects, the second satellite is associated with a second cell, and wherein the first and second cells are different.

In a sixth aspect, alone or in combination with one or more of the above aspects, the fixed radio cells comprises temporary fixed radio cells, and wherein the temporary fixed radio cells have a certain time duration of operation in a particular area and are quasi-earth fixed cells. In some other implementations, the fixed radio cells comprises permanent fixed radio cells.

In a seventh aspect, alone or in combination with one or more of the above aspects, the selection condition includes an expiry time condition of a satellite coverage, a satellite movement condition, an elevation angle difference condition, an angle of arrival condition, a frequency information condition, a signal quality change condition, a network triggered short message condition, or a combination thereof.

In an eighth aspect, alone or in combination with one or more of the above aspects, selecting the cell associated with the second satellite based on the selection condition includes: determining, by the UE, a first expiry time for a cell associated with a first potential satellite of the plurality of potential satellites; determining, by the UE, a second expiry time for a cell associated with a second potential satellite of the plurality of potential satellites; and comparing, by the UE, the first expiry time and the second expiry time to determine a longest expiry time, wherein the cell associated with the second satellite has the longest expiry time.

In a ninth aspect, alone or in combination with one or more of the above aspects, determining the first expiry time includes: calculating the first expiry time based on satellite and beam information for the first potential satellite.

In a tenth aspect, alone or in combination with one or more of the above aspects, the UE 115 further: determines when to perform a measurement operation on a neighbor cell based on expiry time information for the cell associated with the second satellite.

In an eleventh aspect, alone or in combination with one or more of the above aspects, the UE 115 further: receives a system information message or a dedicated radio resource control message indicating expiry time information for one or more cells associated with at least one satellite of the potential satellites.

In a twelfth aspect, alone or in combination with one or more of the above aspects, prior to selecting the cell associated with the second satellite the UE 115: receives a paging indication from the cell associated with the first satellite indicating to monitor a cell associated with a new satellite, the new satellite corresponding to the second satellite.

In a thirteenth aspect, alone or in combination with one or more of the above aspects, selecting the cell associated with the second satellite includes: determining that beam selection or adjustment with the second satellite will be complete prior to a first paging occasion with the first satellite; and monitoring for a paging message in the first paging occasion with the second satellite.

In a fourteenth aspect, alone or in combination with one or more of the above aspects, selecting a cell of the second satellite includes: determining that beam selection or adjustment with the second satellite will occur during a first paging occasion with the first satellite; and monitoring for a paging message in the first paging occasion with the first satellite before selecting a cell of the second satellite.

In a fifteenth aspect, alone or in combination with one or more of the above aspects, the UE 115 further: operates in a Radio Resource Control (RRC) connected state with the first satellite, the UE operating in a first cell ID and with a first tracking area code (TAC) ID; receive a satellite switch message for the first satellite, the satellite switch message indicating the second satellite; and switches to the second satellite based on the satellite switch message, wherein the second satellite is selected based on the satellite switch message.

In a sixteenth aspect, alone or in combination with one or more of the above aspects, the satellite switch message comprises a downlink control information (DCI), a medium access control (MAC) control element (MAC CE), or a beam switch command.

In a seventeenth aspect, alone or in combination with one or more of the above aspects, the satellite switch message is Msg2 (e.g., RAR message) of a Radio Resource Control (RRC) connection setup procedure or a random access (RA) procedure.

In an eighteenth aspect, alone or in combination with one or more of the above aspects, the satellite switch message is Msg4 (e.g., Contention Resolution message) of a Radio Resource Control (RRC) connection setup procedure or a random access (RA) procedure.

In a nineteenth aspect, alone or in combination with one or more of the above aspects, the satellite switch message is Msg2 or Msg4 of a Radio Resource Control (RRC) connection setup procedure or a random access (RA) procedure and is received from the cell associated with the second satellite.

In a twentieth aspect, alone or in combination with one or more of the above aspects, hybrid automatic repeat request (HARQ) processes of the cell associated with the first satellite are continued in the cell associated with the second satellite after switching to the second satellite.

In a twenty-first aspect, alone or in combination with one or more of the above aspects, the satellite switch message comprises a beam switch command message, and wherein the beam switch command message is UE specific or group specific indication to continue a bandwidth part configuration in the cell associated with the second satellite.

Accordingly, a UE and a base station may perform satellite selection operations. By performing satellite selection operations, throughput and reliability may be increased and such operations may be compatible with fixed radio networks and/or with reduced capability (e.g., less advanced) devices.

FIG. 6 is a flow diagram illustrating example blocks executed by a UE configured according to an aspect of the present disclosure. The example blocks will also be described with respect to UE 115 as illustrated in FIG. 8.

At block 600, a wireless communication device, such as a UE, operates in a RRC connected state with a first satellite, the UE operating in a first cell ID and with a first TAC ID in a fixed radio cell network. For example, the UE 115 and the first satellite are connected to each other and the UE 115 is in a RRC connected mode.

At block 601, the UE 115 receives a satellite switch message for the first satellite. For example, the UE 115 receives a message which indicates that the UE is to connect to another satellite, as described with reference to FIGS. 3 and 4. To illustrate, the first satellite transmits a paging message, a DCI transmission, or a RRC message which signals a handover.

At block 602, the UE 115 determines a second satellite based on the satellite switch message. For example, the UE 115 determines to switch to a second satellite based on a paging message or a handover request message, as described with reference to FIGS. 3 and 4. The paging message or handover request message may indicate the satellite, the cell, or both.

At block 603, the UE 115 switches to the second satellite. For example, the UE 115 switches to or is handed over to another satellite, as described with reference to FIGS. 3 and 4. To illustrate, the first satellite may transmit a paging message or a RRC reconfiguration message to the UE to facilitate the UE connecting to the second satellite. The other satellite may be associated with another cell or the same cell as the first satellite.

The UE 115 may execute additional blocks (or the UE 115 may be configured further perform additional operations) in other implementations. For example, the UE 115 may perform one or more operations described above.

Accordingly, a UE and a base station may perform satellite selection operations. By performing satellite selection operations, throughput and reliability may be increased and such operations may be compatible with fixed radio networks and/or with reduced capability (e.g., less advanced) devices.

Figure 9:
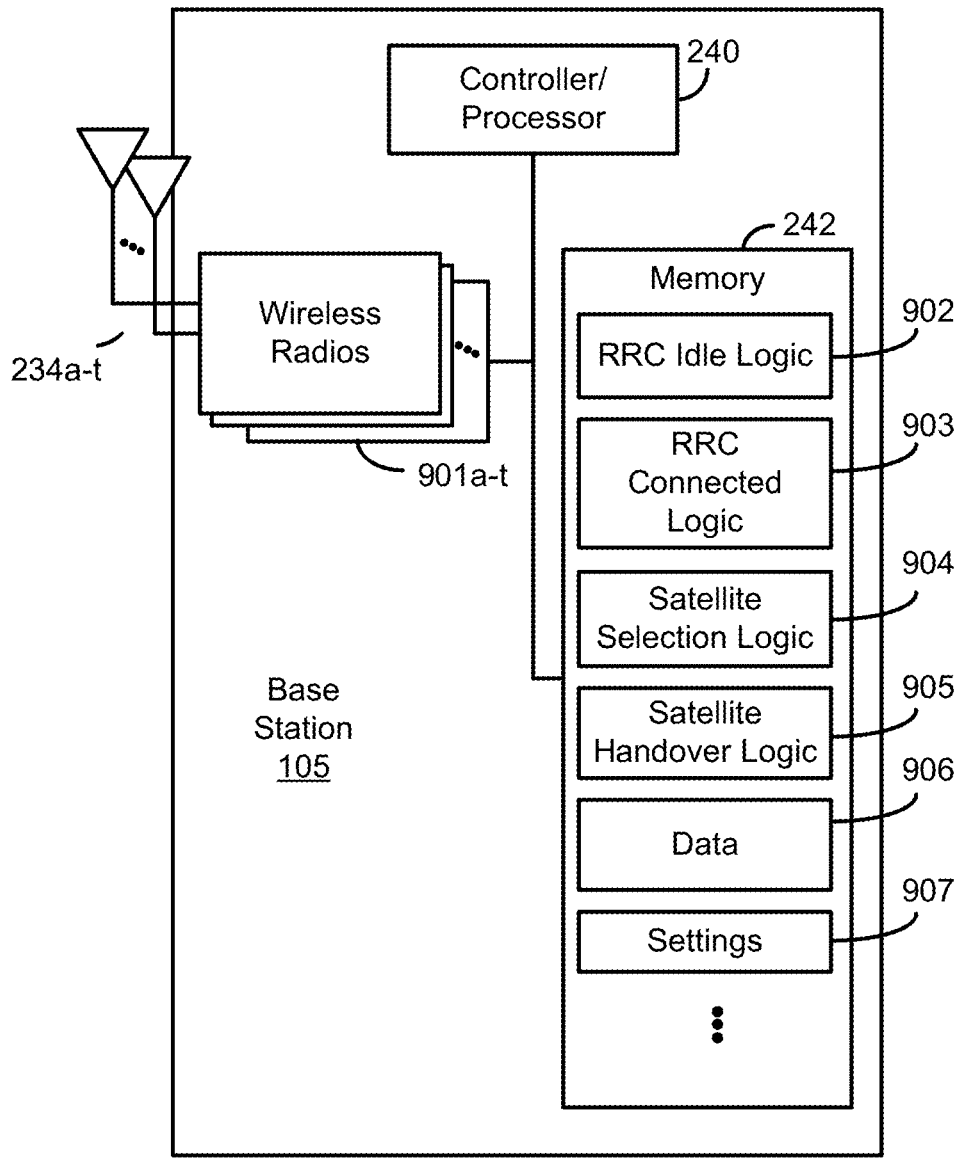
FIG. 9 is a block diagram conceptually illustrating a design of a base station configured to perform precoding information update operations according to some embodiments of the present disclosure.

FIG. 7 is a flow diagram illustrating example blocks executed by wireless communication device configured according to another aspect of the present disclosure. The example blocks will also be described with respect to base station 105 (e.g., gNB) as illustrated in FIG. 9. FIG. 9 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 901a-t and antennas 234a-t. Wireless radios 901a-t includes various components and hardware, as illustrated in FIG. 2 for base station 105, including modulator/demodulators 232a-t, MIMO detector 236, receive processor 238, transmit processor 220, and TX MIMO processor 230. As illustrated in the example of FIG. 9, memory 242 stores RRC idle logic 902, RRC connected logic 903, satellite selection logic 904, satellite handover logic data 905, data 906, and settings data 907. One of more of 902-907 may include or correspond to one of 802-807.

At block 700, a wireless communication device, such as a satellite base station, operates in a RRC connected state with a particular user equipment (UE) and servicing a first cell ID and a first TAC ID in a fixed radio cell network. For example, the base station 105 and the UE are connected to each other and the UE is in a RRC connected mode, as described with reference to FIGS. 3 and 4.

At block 701, the base station 105 determines to switch the particular UE to a second satellite. For example, the base station 105 determines to switch the particular UE to a second satellite based on a position of the first satellite, as described with reference to FIGS. 3 and 4. To illustrate, the base station 105 may determine a coverage to cell or cells based on a position of the satellite and optionally satellite movement information.

At block 702, the base station 105 transmits a satellite switch message to the particular UE based on determining to switch the particular UE to the second satellite. For example, the base station 105 transmits message which indicates that the UE is to connect to another satellite, as described with reference to FIGS. 3 and 4. To illustrate, the first satellite transmits a paging message, a DCI transmission, or a RRC message which signals a handover.

At block 703, the base station 105 switches the particular UE to the second satellite. For example, the base station 105 switches or hands over the UE to another satellite, as described with reference to FIGS. 3 and 4. To illustrate, the first satellite may transmit a paging message or a RRC reconfiguration message to the UE to facilitate the UE connecting to the second satellite. The other satellite may be associated with another cell or the same cell as the first satellite.

The base station 105 may execute additional blocks (or the base station 105 may be configured further perform additional operations) in other implementations. For example, the base station 105 may perform one or more operations described above, including such actions as described in FIG. 5 or 6 and as attributed to the UE 115. As another example, the base station 105 (e.g., a satellite network entity or satellite base station) may operate in accordance with one or more aspects described below.

In a first aspect, switching the particular UE to second satellite includes switching the particular UE to a cell associated with the second satellite and maintaining an active bandwidth part (BWP) of the satellite network entity, maintaining hybrid automatic repeat request (HARQ) processes of the satellite network entity, or both.

In a second aspect, alone or in combination with the first aspect, the base station 105 further: transmits a bandwidth part (BWP) switch command to the UE, the BWP switch command configured to change an active BWP of the satellite network entity and the UE.

In a third aspect, alone or in combination with one or more of the above aspects, switching the second satellite includes: adjusting one or more timers based on an offset interruption, the offset interruption determined based on satellite switching or switching a pointing angle or beam angle of the UE.

In a fourth aspect, alone or in combination with one or more of the above aspects, switching to the second satellite includes: adjusting uplink scheduling, downlink scheduling, or both, based on an offset interruption, the offset interruption determined based on satellite switching or a switching in a pointing angle or beam angle of the UE.

In a fifth aspect, alone or in combination with one or more of the above aspects, the satellite switch message indicates a target beam, a new round trip delay (RTD) value, a new timing advance (TA) value, or a combination thereof.

Accordingly, a UE and a base station may perform satellite selection operations. By performing satellite selection operations, throughput and reliability may be increased and such operations may be compatible with fixed radio networks and/or with reduced capability (e.g., less advanced) devices.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein relating to satellite switching may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 5-7) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication comprising:
   operating, by a user equipment (UE), in a network with fixed radio cells;
   determining, by the UE, a plurality of potential satellites for selecting a first cell to camp on, the first cell associated with a first satellite;
   performing cell reselection, by the UE, to select a cell associated with a second satellite using a selection condition, wherein the selection condition indicates timing information for a cell stop time, the cell stop time indicating when a serving radio cell will stop serving a particular area; and
   switching to the cell associated with the second satellite before the cell stop time by establishing, by the UE, a connection with the second satellite for paging monitoring or wireless communications.

2. The method of claim 1, wherein establishing the connection includes:
   camping on the second satellite for paging monitoring operations when in a RRC idle state; or
   resuming a connection for uplink transmission, downlink transmissions, or both, when in a RRC connected state.

3. The method of claim 1, further comprising, prior to performing cell reselection:
   monitoring, by the UE, for a first paging message from the first satellite;
   receiving, by the UE, the first paging message;
   adjusting, by the UE, beam settings, round trip delay (RTD) settings, timing advance (TA) settings, or a combination thereof;
   monitoring, by the UE, for a second paging message from the second satellite; and
   receiving, by the UE, the second paging message.

4. The method of claim 1, wherein the second satellite is associated with a second cell, and wherein the first and second cells are the same cell.

5. The method of claim 1, wherein the second satellite is associated with a second cell, and wherein the first and second cells are different.

6. The method of claim 1, wherein the fixed radio cells comprises temporary fixed radio cells, and wherein the temporary fixed radio cells have a certain time duration of operation in a particular area and are quasi-earth fixed cells.

7. The method of claim 1, wherein the selection condition includes an expiry time condition of a satellite coverage, a satellite movement condition, an elevation angle difference condition, an angle of arrival condition, a frequency information condition, a signal quality change condition, a network triggered short message condition, or a combination thereof.

8. The method of claim 1, wherein selecting the cell associated with the second satellite based on the selection condition includes:
   determining, by the UE, a first expiry time for a cell associated with a first potential satellite of the plurality of potential satellites;
   determining, by the UE, a second expiry time for a cell associated with a second potential satellite of the plurality of potential satellites; and
   comparing, by the UE, the first expiry time and the second expiry time to determine a longest expiry time, wherein the cell associated with the second satellite has the longest expiry time.

9. The method of claim 8, wherein determining the first expiry time includes:
   calculating, by the UE, the first expiry time based on satellite and beam information for the first potential satellite.

10. The method of claim 1, further comprising:
   determining, by the UE, when to perform a measurement operation on a neighbor cell based on expiry time information for the cell associated with the second satellite.

11. The method of claim 1, further comprising:
   receiving, by the UE, a system information message or a dedicated radio resource control message indicating expiry time information for one or more cells associated with at least one satellite of the potential satellites.

12. An apparatus for wireless communication comprising:
   a processor, and
   a memory coupled to the processor, the memory storing instructions which when executed by the processor cause the processor to:
      operate in a network with fixed radio cells;
      determine a plurality of potential satellites for selecting a first cell to camp on, the first cell associated with a first satellite;
      receive a paging indication from the first cell associated with the first satellite indicating to monitor a cell associated with a new satellite, the new satellite corresponding to a second satellite;
      perform cell reselection to select a cell associated with the second satellite using a selection condition; and
      establish a connection with the second satellite for paging monitoring or wireless communications.

13. The apparatus of claim 12, wherein to select the cell associated with the second satellite includes to:
   determine that beam selection or adjustment with the second satellite will be complete prior to a first paging occasion with the first satellite; and
   monitor for a paging message in the first paging occasion with the second satellite.

14. The apparatus of claim 12, wherein to select a cell of the second satellite includes to:
   determine that beam selection or adjustment with the second satellite will occur during a first paging occasion with the first satellite; and
   monitor for a paging message in the first paging occasion with the first satellite before selecting a cell of the second satellite.

15. The apparatus of claim 12, wherein the instructions when executed by the processor further cause the processor to:
      operate in a Radio Resource Control (RRC) connected state with the first satellite, the UE operating in a first cell ID and with a first tracking area code (TAC) ID;
      receive a satellite switch message for the first satellite, the satellite switch message indicating the second satellite; and
      switch to the second satellite based on the satellite switch message, wherein the second satellite is selected based on the satellite switch message.

16. The apparatus of claim 15, wherein the satellite switch message comprises a downlink control information (DCI), a medium access control (MAC) control element (MAC CE), or a beam switch command.

17. The apparatus of claim 15, wherein the satellite switch message is Msg2 of a Radio Resource Control (RRC) connection setup procedure or a random access (RA) procedure.

18. The apparatus of claim 15, wherein the satellite switch message is Msg4 of a Radio Resource Control (RRC) connection setup procedure or a random access (RA) procedure.

19. The apparatus of claim 15, wherein the satellite switch message is Msg2 or Msg4 of a Radio Resource Control (RRC) connection setup procedure or a random access (RA) procedure and is received from the cell associated with the second satellite.

20. The apparatus of claim 15, wherein hybrid automatic repeat request (HARQ) processes of the cell associated with the first satellite are continued in the cell associated with the second satellite after switching to the second satellite.

21. The apparatus of claim 15, wherein the satellite switch message comprises a beam switch command message, and wherein the beam switch command message is UE specific or group specific indication to continue a bandwidth part configuration in the cell associated with the second satellite.

22. A method of wireless communication comprising:
   operating, by a satellite network entity, with a particular user equipment (UE) and servicing a first cell ID and a first tracking area code (TAC) ID in a fixed radio cell network;
   transmitting, by the satellite network entity, a satellite switch message to the particular UE based on determining to switch the particular UE to a second satellite; and
   switching, by the satellite network entity, the particular UE to the second satellite, wherein switching to the second satellite includes adjusting one or more timers based on an offset interruption, the offset interruption determined based on satellite switching or switching a pointing angle or beam angle of the UE.

23. The method of claim 22, wherein switching the particular UE to second satellite includes switching the particular UE to a cell associated with the second satellite and maintaining an active bandwidth part (BWP) of the satellite network entity, maintaining hybrid automatic repeat request (HARQ) processes of the satellite network entity, or both.

24. The method of claim 22, further comprising:
   transmitting, by the satellite network entity, a bandwidth part (BWP) switch command to the UE, the BWP switch command configured to change an active BWP of the satellite network entity and the UE.

25. An apparatus for wireless communication comprising:
   a processor; and
   a memory coupled to the processor, the memory storing instructions which when executed by the processor cause the processor to:

operate with a particular user equipment (UE) and servicing a first cell ID and a first tracking area code (TAC) ID in a fixed radio cell network;

transmit a satellite switch message to the particular UE based on determining to switch the particular UE to a second satellite; and switch the particular UE to the second satellite, wherein switching to the second satellite includes adjusting one or more timers based on an offset interruption, the offset interruption determined based on satellite switching or switching a pointing angle or beam angle of the UE.

26. The apparatus of claim 25, wherein to switch to the second satellite includes to adjust uplink scheduling, downlink scheduling, or both, based on an offset interruption, the offset interruption determined based on satellite switching or a switching in a pointing angle or beam angle of the UE.

27. The apparatus of claim 25, wherein the satellite switch message indicates a target beam, a new round trip delay (RTD) value, a new timing advance (TA) value, or a combination thereof.

* * * * *